United States Patent [19]
Chen et al.

[11] Patent Number: 6,108,109
[45] Date of Patent: Aug. 22, 2000

[54] METHOD, DEVICE AND OPTICAL PACKAGE WITH ENHANCED TEMPERATURE STABILITY

[75] Inventors: Alan Gengsheng Chen, Schaumburg; Jang-Hun (James) Yeh, Streamwood; Sean Xin Wu, Palatine, all of Ill.

[73] Assignee: Motorola, Inc., Schaumburg, Ill.

[21] Appl. No.: 08/978,900

[22] Filed: Nov. 26, 1997

[51] Int. Cl.[7] ............................................. G02B 5/32
[52] U.S. Cl. .............................. 359/15; 359/24; 372/102
[58] Field of Search ................................ 359/1, 15, 24, 359/25, 27; 372/92, 102; 257/80

[56] References Cited

U.S. PATENT DOCUMENTS

| | | |
|---|---|---|
| 5,285,466 | 2/1994 | Tabatabaie . |
| 5,663,944 | 9/1997 | Mun . |
| 5,801,402 | 9/1998 | Shin ........................................... 257/80 |

OTHER PUBLICATIONS

David Brady, Alan G.-S. Chen, and George Rodriguez, Volume holographic pulse shaping, Apr. 15, 1992, vol. 17, No. 8, Optics Letters pp. 610–612.

T. Kim, T.K. Kim, E.K. Lee, J.Y. Kim and T.I. Kim, A Single Transverse Mode Operation of Top Surface Emitting Laser Diode with a Integrated Photo–Diode, Samsung Advanced Institute of Technology pp. 416–417.

*Primary Examiner*—Cassandra Spyrou
*Assistant Examiner*—Craig Curtis
*Attorney, Agent, or Firm*—K. Cyrus Khosravi

[57] ABSTRACT

The present invention provides a method, device and optical package (10,22) for enhancing a temperature stability by controlling a variable characteristic of an optical package and optical interconnect system. The device includes an optical emitter (14) for generating a predetermined beam of light (16) having a predetermined wavelength, a photosensing unit (20) for receiving a portion (18) of the predetermined beam of light (16), and a stability-enhancing broad bandwidth holographic optical element (12), wherein the predetermined wavelength of the predetermined beam of light substantially coincides with a working range wavelength of a broad bandwidth of the stability-enhancing broad bandwidth holographic optical element (12), for enhancing the temperature stability of the optical package and the optical interconnect system in response to changes in a thermal expansion of the stability-enhancing broad bandwidth holographic optical element (12) and the changes in the predetermined wavelength of the predetermined optical beam caused by temperature variations.

24 Claims, 4 Drawing Sheets

METHOD, DEVICE AND OPTICAL PACKAGE WITH ENHANCED TEMPERATURE STABILITY

RELATED INVENTION

The present invention is related to the following invention which is assigned to the same assignee as the present invention:

"Device, Method, Bar Code Scanner and Optical Storage Unit for Providing Optical Feedback for an optical Emitter Using Holograms", having Ser. No. 08/682,973, Disclosure No. SST96004, Yeh et al., filed on Jul. 16, 1996.

The subject matter of the above-identified related invention is hereby incorporated by reference into the disclosure of this invention.

FIELD OF THE INVENTION

The invention relates generally to the field of optical systems and more particularly, to enhancing temperature stability of optical interconnect packages.

BACKGROUND OF THE INVENTION

Optical systems such as vertical cavity surface emitting laser (VCSEL) optical packages and optical interconnect systems, which use semiconductor lasers and holographic optical elements, are sensitive to temperature variations. It has been realized that the wavelength of the light beam generated by the semiconductor lasers varies due to temperature variations, thereby adversely affecting the automatic power control mechanism/feedback operation of the VCSEL optical packages and the signal transfer characteristics of the optical interconnect systems. It has also been realized that a temperature change, for instance, of 5 degrees Centigrade, in the range of 25 to 30 degrees Centigrade results in a large thermal expansion of the holographic optical elements such as the DuPont OmniDex photopolymer. This thermal expansion produces an adverse change in the diffraction efficiency of the holographic optical element (HOE). For example, in a HOE with a thickness of 20 microns having a single 18 nanometers (nm) bandwidth, a 5 degrees Centigrade temperature variation results in a wavelength shift of approximately 2 nanometers (nm) in the bandwidth of the HOE.

Thus, there is a need for enhancing the temperature stability of the optical systems due to changes in the wavelength of the light beam generated by the semiconductor lasers and the shifts in the bandwidth of the holographic optical elements caused by temperature variations.

DETAILED DESCRIPTION OF A PREFERRED EMBODIMENT

Figure 1:
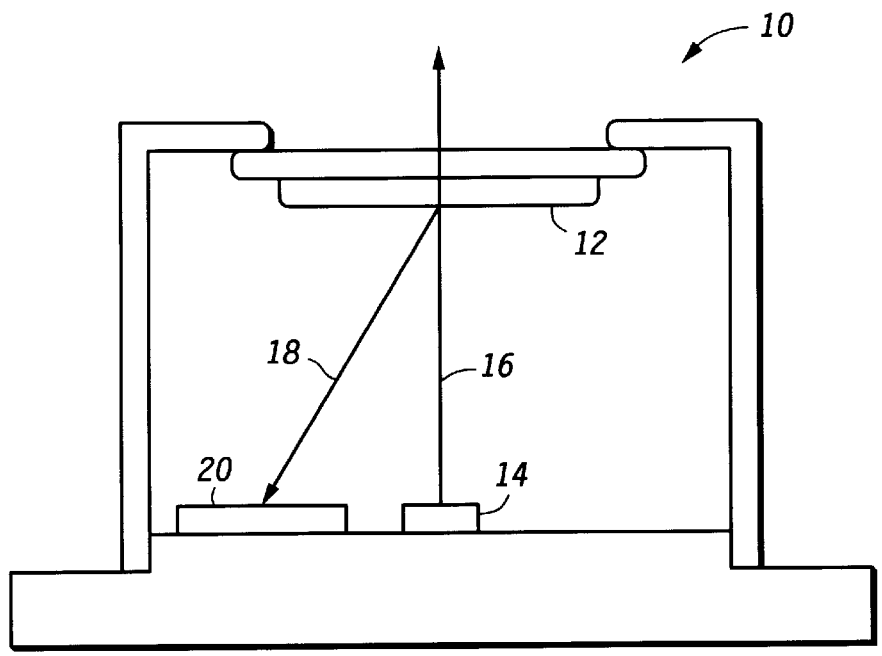
FIG. 1 is a schematic representation of an optical package illustrating a portion of the light diffracted utilizing a broad bandwidth holographic optical element in accordance with the first embodiment of the present invention.

Holographic optical elements may be used for automatic power control mechanisms in optical packages and for signal transfer in optical interconnect systems. Referring to FIG. 1, a first embodiment of an optical package 10 incorporating a stability-enhancing broad bandwidth HOE 12 in accordance with the present invention is illustrated. As shown in FIG. 1, the optical package 10 includes an optical emitter such as a VCSEL 14 for generating a beam of light 16 that is incident upon the stability-enhancing broad bandwidth HOE 12. A portion of the light 18 is diffracted onto a photo-sensing unit 20 which provides an electrical signal for monitoring/feedback control for automatic power control mechanism of the optical emitter 14. It has been realized that in optical packages using a "single grating" HOE instead of a "broad bandwidth" HOE, the diffraction of the portion of the light 18 has been adversely affected by temperature changes which has resulted in unreliable power control in the optical package 10. The bandwidth of a single grating HOE is limited to the width of the single bandwidth associated with the single grating. Hence, a single grating HOE provides a single, narrow bandwidth. Use of a single grating HOE in an optical package such as a VCSEL package limits the effectiveness of the automatic power control mechanism. Since the single grating HOE has a single/narrow bandwidth, the wavelength of the beam of light generated by the optical emitter must be precisely maintained within the range of the narrow bandwidth of the single grating HOE in order to produce a diffracted portion of light for use in the automatic power control mechanism.

Figure 2:
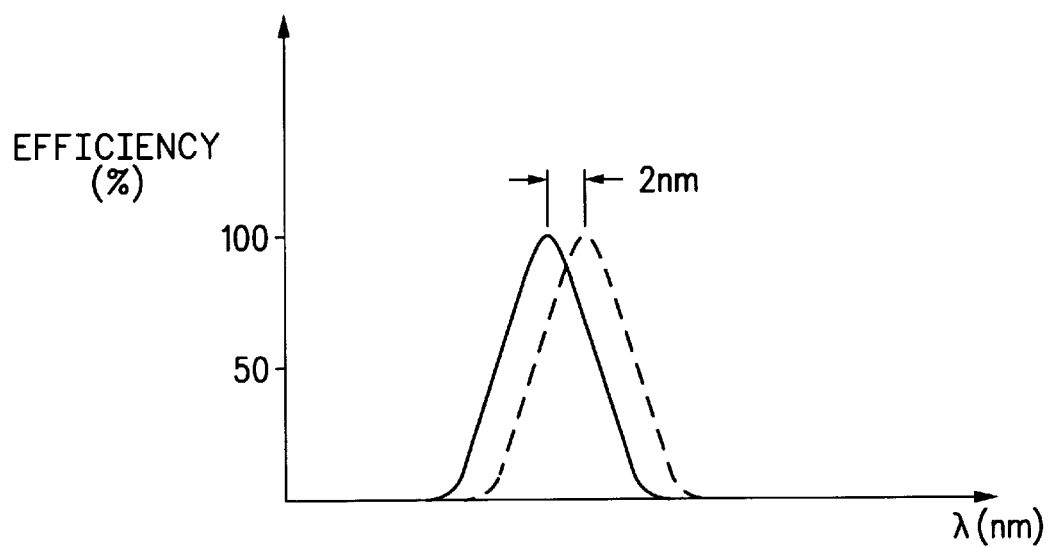
FIG. 2 is a representation of a shift in the single bandwidth of a conventional single grating holographic optical element caused by temperature variation.

For example, a single grating HOE with a thickness of 20 microns has a single bandwidth of approximately 18 nm, and a single grating HOE with a thickness of 5 microns has a single bandwidth of approximately 40 nm. In operation, the optical emitter 14 generates a beam of light having a predetermined wavelength. For instance, in the present invention, the preferred operating wavelength is 850 nm. During operation, the optical package 10 may be affected by temperature variations. Temperature variations affect the stability and performance of the optical package 10 in two ways. First, temperature variations may affect the bandwidth of a conventional single grating HOE, due to thermal expansion of the HOE, by causing the shifting of the narrow bandwidth. As shown in FIG. 2, for example, a change of 5 degrees Centigrade in temperature would cause a shift of approximately 2 nanometers of a single bandwidth of 18 nm in a single grating narrow bandwidth HOE having a thickness of 20 microns. Moreover, the temperature variations may cause deviations in the predetermined wavelength of the beam of light of the optical emitter 14.

Figure 3:
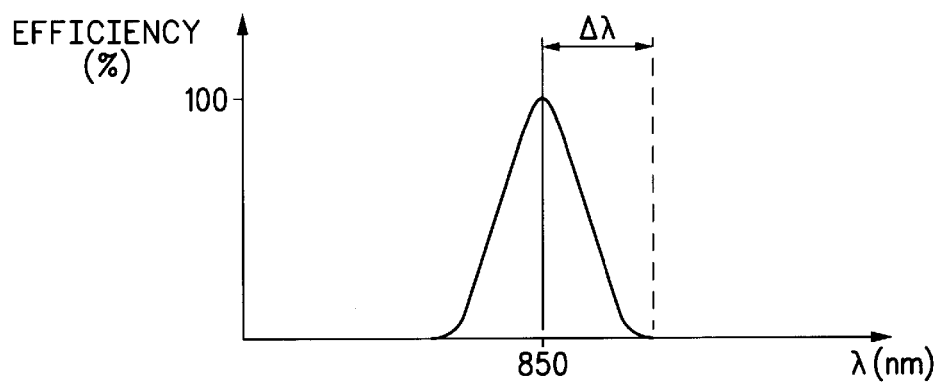
FIG. 3 is a representation of a change in the predetermined wavelength of the light beam generated by an optical emitter caused by temperature variation using a conventional single grating holographic optical element.

As shown in FIG. 3, in an optimal operating condition the predetermined wavelength of the beam of light generated by the optical emitter is coincident with the center-wavelength of the bandwidth of the conventional single grating HOE. The center-wavelength of a bandwidth is also known as the Bragg wavelength. At the Bragg wavelength the diffraction efficiency of the single grating HOE would be at the optimal level. In the optimal operating condition, the optical package would produce the highest diffraction efficiency, namely, all of the portion of the light beam that is intended to be diffracted would be diffracted in the desired direction. In the event of temperature changes, the predetermined wavelength of the light beam of the optical emitter may change, which in turn may change the diffraction efficiency of the beam of light incident upon the HOE. As shown in FIG. 3, the change in the predetermined wavelength is shown as ($\Delta\lambda$). When large temperature variations are experienced, the predetermined wavelength of the light beam of the optical emitter may not coincide with the range of the wavelength of the bandwidth of the conventional single grating HOE. In that event, there will be no diffracted portion of the light beam such that all of the light beam generated by the optical emitter will be merely transmitted through the HOE. In this case, the conventional single grating HOE will be effectively transparent to the light beam generated by the optical emitter. That is, when the predetermined wavelength of the light beam changes/shifts outside of the range of the wavelength of the conventional single grating HOE, then the diffracted portion of the light will be eliminated, rendering the automatic power control mechanism of an optical package inoperative.

In the present invention, a stability-enhancing broad bandwidth HOE 12 having a multiple grating structure is utilized to provide for the control of a variable characteristic of the optical package 10 such as a change in the operating wavelength of the optical emitter 14 and a shift in the bandwidth of the HOE caused by temperature variations. The utilization of the stability-enhancing broad bandwidth HOE compensates for thermal expansion of the HOE and a change in the operating wavelength of the optical emitter. A broad bandwidth HOE may be produced/recorded by conventional recording methods known in the art.

Figure 4:
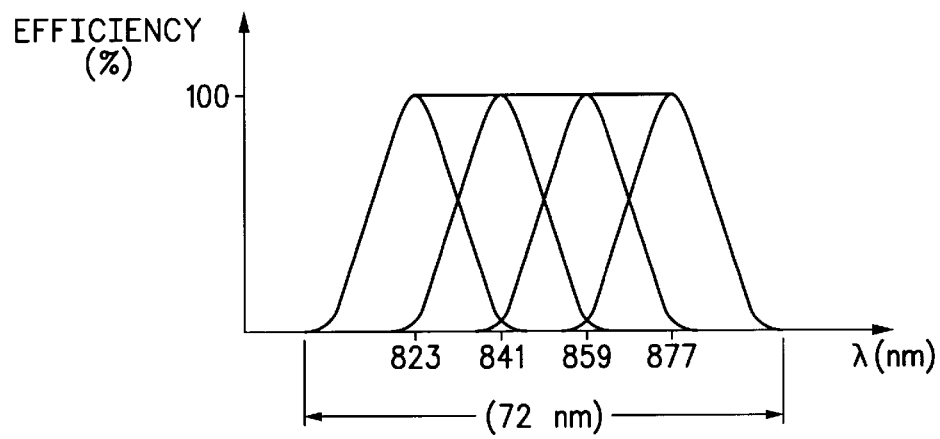
FIG. 4 is a representation of a working range of the broad bandwidth of the broad bandwidth holographic optical element device in accordance with the present invention.

In the preferred embodiment of the present invention, the stability-enhancing broad bandwidth HOE is achieved by the application of four grating structures each having a predetermined bandwidth with an associated center-wavelength. As shown in FIG. 4, four grating structures having center-wavelengths of 823 nm, 841 nm, 859 nm, and 877 nm, respectively, are recorded on the substrate of the stability-enhancing broad bandwidth HOE 12 such that the bandwidth associated with each grating structure partially overlaps the bandwidth of a respective adjacent grating structure. The bandwidth of each grating is approximately 18 nm. The composition of the four aforementioned bandwidths provides a broad bandwidth with a total bandwidth having the range of approximately 72 nm. The 72 nm broad bandwidth range constitutes the working range wavelength of the broad bandwidth HOE of the present invention. It must be noted that the present invention is not limited to the 72 nm for the working range of the broad bandwidth HOE, but rather, the 72 nm range is one example of a workable range for the present invention.

Figure 5:
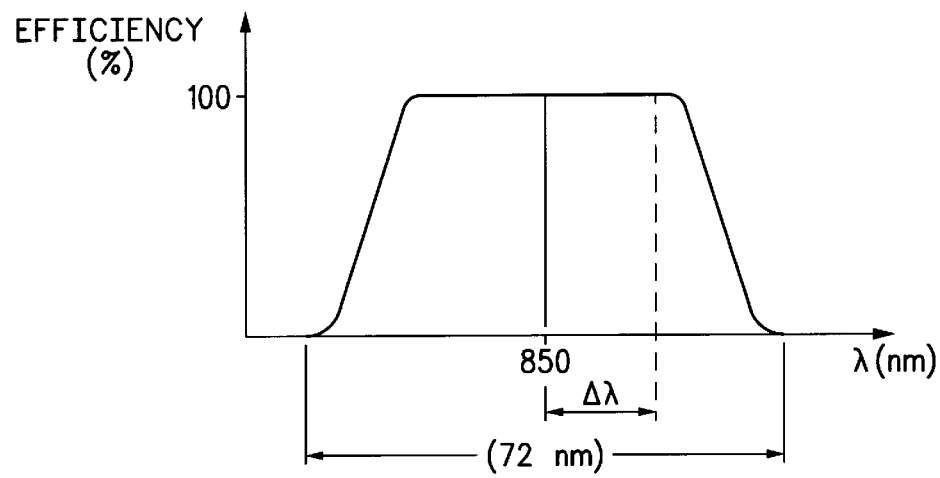
FIG. 5 is a representation of a change in the predetermined wavelength of the light beam generated by an optical emitter, wherein the predetermined wavelength of the light generated by the optical emitter coincides/falls within the working range wavelength of the broad bandwidth holographic optical element in accordance with the present invention.
Figure 6:
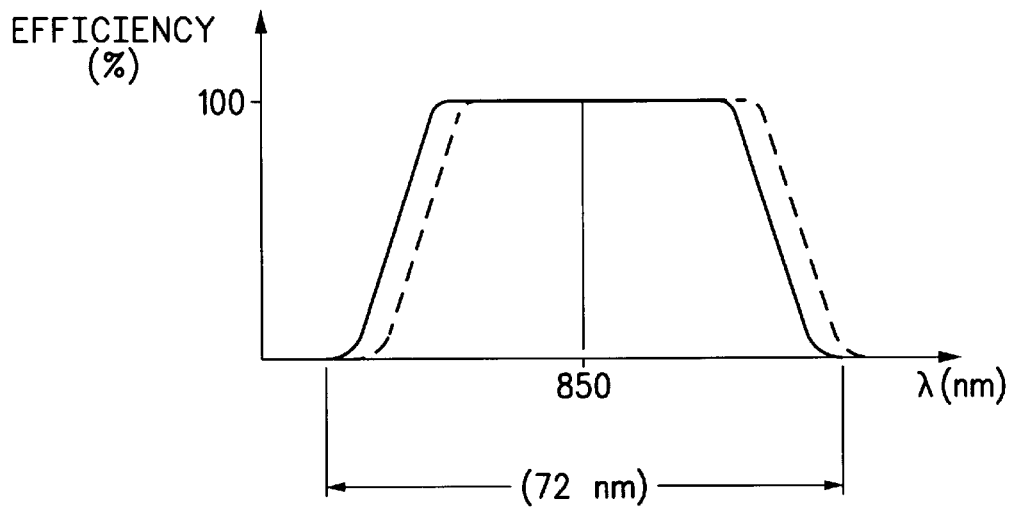
FIG. 6 is a representation of the working range wavelength of the broad bandwidth holographic optical element device in accordance with the present invention, wherein the working range wavelength is shifted due to thermal expansion of the broad bandwidth holographic optical element.

Referring to FIG. 5, as the predetermined wavelength of the beam of light may change due to temperature variations by the amount of ($\Delta\lambda$), the diffraction efficiency of the broad bandwidth HOE essentially remains unchanged since the predetermined wavelength of the beam of light falls within/coincides with the working range wavelength of the broadband width of the stability-enhancing broad bandwidth HOE 12. Similarly, referring to FIG. 6, a shift in the working range of the broad bandwidth of the stability-enhancing broad bandwidth HOE 12 caused by temperature variations and thermal expansion of the stability-enhancing broad bandwidth HOE 12 does not affect the diffraction efficiency of the broad bandwidth HOE 12. As shown in FIG. 6, notwithstanding the shift in the working range wavelength of the stability-enhancing broad bandwidth HOE 12, the predetermined wavelength, namely, 850 nm, of the beam of light generated by the optical emitter 14 falls within the working range wavelength of the broad bandwidth HOE. The implementation of the stability-enhancing broad bandwidth HOE 12 of the present invention in the optical package 10 as shown in FIG. 1 allows for the control of a variable characteristic of the optical package 10 such as a change in the operating wavelength of the optical emitter 14 and a shift in the bandwidth of the HOE 12 due to thermal expansion caused by temperature variations. In the embodiment of FIG. 1, the optical emitter may be a VCSEL, and the stability-enhancing broad bandwidth HOE 12 of the present invention provides an efficient mechanism for controlling the variable characteristic of the automatic power control for the VCSEL.

Thus, the present invention provides for a device for controlling a variable characteristic for automatic power control for a vertical cavity surface emitting laser in an optical package. The optical package including an optical emitter in the form of a VCSEL 14 for generating a beam of light having a predetermined wavelength and a photo-sensing unit 20 for receiving a portion of the beam of light having the predetermined wavelength. A stability-enhancing broad bandwidth holographic optical element 12, aligned on a common axis with the optical emitter, is utilized in the present invention, wherein the predetermined wavelength of the beam of light substantially coincides with a working range wavelength of a broad bandwidth of the stability-enhancing broad bandwidth holographic optical element 12, for controlling a variable characteristic of an automatic power control for the VCSEL 14, wherein the variable characteristic changes based on a thermal expansion of the stability-enhancing broad bandwidth holographic optical element 12 and a change in the predetermined wavelength of the beam of light when temperature changes Furthermore, the present invention provides an optical package with enhanced temperature stability. The optical package comprising an optical emitter 14 for generating a predetermined beam of light having a predetermined wavelength and a photo-sensing unit 20 for receiving a portion of the predetermined beam of light having the predetermined wavelength. The optical package of the present invention further includes a stability-enhancing broad bandwidth holographic optical element 12 aligned on a common axis with the optical emitter 14, wherein the predetermined wavelength of the predetermined beam of light, substantially coincides with a working range wavelength of a broad bandwidth of the stability-enhancing broad bandwidth holographic optical element 12, for enhancing the temperature stability of the optical package in response to changes in a thermal expansion of the stability-enhancing broad bandwidth holographic optical element 12 and a change in the predetermined wavelength of the predetermined beam of light caused by temperature variations.

Figure 7:
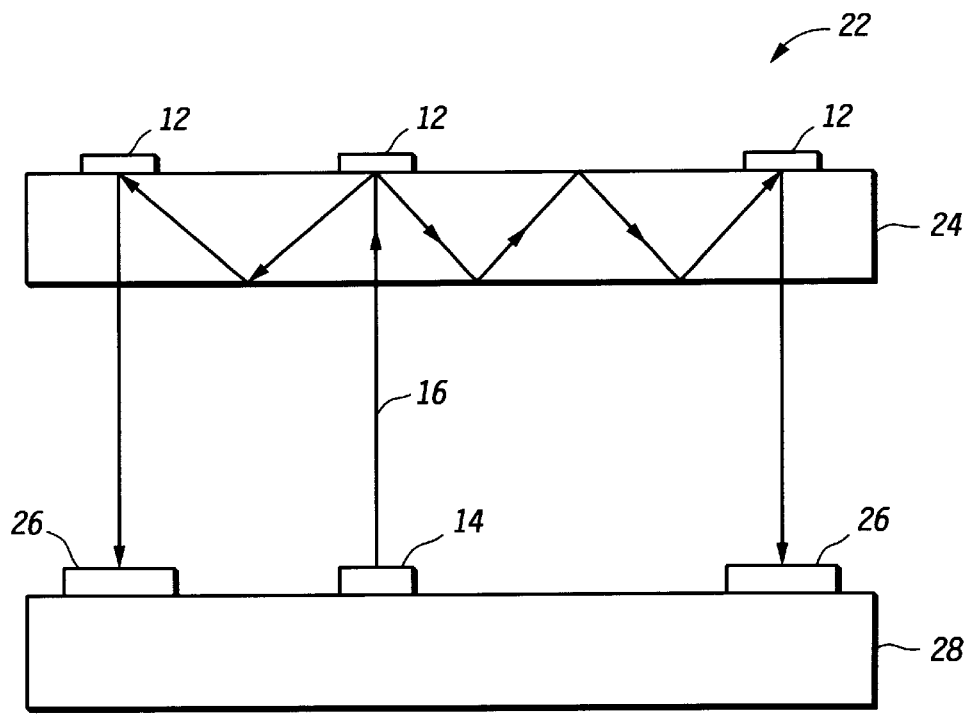
FIG. 7 is a schematic representation of an optical interconnect system illustrating portions of the light generated by an optical emitter diffracted utilizing a broad bandwidth holographic optical element in accordance with the second embodiment of the present invention.

Another embodiment of the present invention is shown in FIG. 7. Referring to FIG. 7, an optical interconnect system 22 incorporating the stability-enhancing broad bandwidth HOE 12 in accordance with the present invention is shown. In this embodiment, stability-enhancing broad bandwidth HOEs 12 are attached to an optically transparent substrate (OTS) 24 providing for optical signal transfer from an optical emitter 14 such as a laser element to a plurality of electrical elements such as integrated circuit chips 26 on at least one electrical substrate 28. As explained above, the implementation of a stability-enhancing broad bandwidth HOE 12 provides for the efficient diffraction of a portion of the beam of light 16 generated by the optical emitter, providing for a reliable signal transfer in optical interconnect systems.

Thus, as shown in FIG. 7, the present invention provides a device for controlling a variable characteristic of an optical interconnect system 22 for signal transfer to at least one electrical element 26, comprising at least one optical emitter 14, positioned on the electrical substrate 28, for generating a beam of light having a predetermined wavelength. The at least one electrical element is positioned on the electrical substrate 28 and at least one optical transfer medium 24 overlies the electrical substrate 28. The optical transfer medium 24 has at least one stability-enhancing broad bandwidth holographic optical element 12 thereon for transferring the beam of light to the at least one electrical element 26. The predetermined wavelength of the beam of light substantially coincides with a working range wavelength of a broad bandwidth of the stability-enhancing broad bandwidth holographic optical element 12, for controlling a variable characteristic of the optical interconnect system 22 in response to changes in a thermal expansion of the at least one stability-enhancing broad bandwidth holographic optical element 12, and the changes in the predetermined wavelength of the beam of light of the at least one optical emitter 14 when temperature changes.

Figure 8:
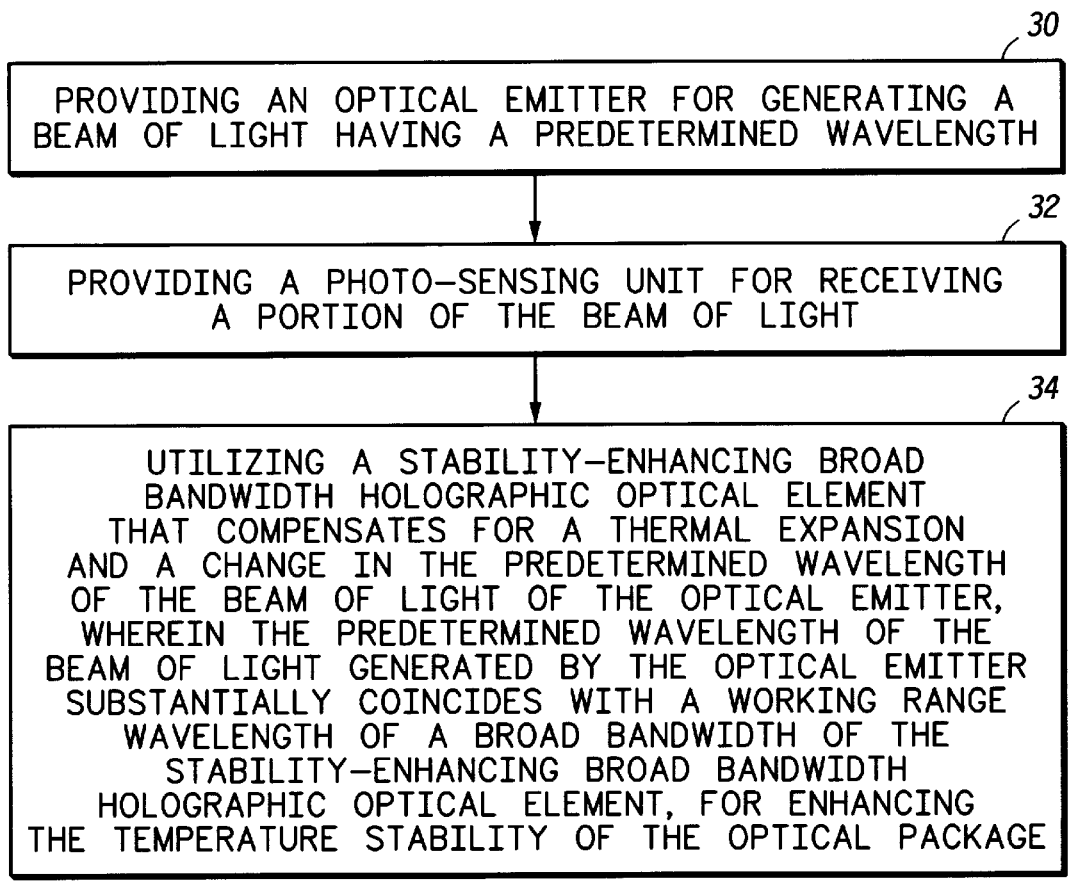
FIG. 8 is a flow chart showing one embodiment of steps in accordance with the present invention.

FIG. 8 is a graphic representation of one embodiment of steps of a method of enhancing a temperature stability of an optical package in accordance with the present invention. The method includes the steps of: a) providing an optical emitter such as a vertical cavity surface emitting laser VCSEL for generating a beam of light having a predetermined wavelength (30); b) providing a photo-sensing unit for receiving a portion of the beam of light (32); c) utilizing a stability-enhancing broad bandwidth holographic optical element that compensates for a thermal expansion and a change in the predetermined wavelength of the beam of light of the optical emitter, wherein the predetermined wavelength of the beam of light generated by the optical emitter substantially coincides with a working range wavelength of a broad bandwidth of the stability-enhancing broad bandwidth holographic optical element, for enhancing the temperature stability of the optical package (34).

Thus, the present invention advantageously provides for the use of broad bandwidth HOE for enhancement of the temperature stability of optical packages, optical interconnect systems, and the like by controlling a variable characteristic such as a change in the operating wavelength of the optical emitter and a shift in the bandwidth of the HOE caused by temperature variations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of enhancing temperature stability of an optical package, the method comprising the steps of:
   a) providing an optical emitter for generating a beam of light having a predetermined wavelength;
   b) providing a photo-sensing unit for receiving a portion of the beam of light;
   c) utilizing a stability-enhancing broad bandwidth holographic optical element that compensates for a thermal expansion and a change in the predetermined wavelength of the beam of light of the optical emitter, wherein the predetermined wavelength of the beam of light generated by the optical emitter substantially coincides with a working range wavelength of a broad bandwidth of the stability-enhancing broad bandwidth holographic optical element, for enhancing the temperature stability of the optical package.

2. The method of claim 1, wherein the broad bandwidth of the stability-enhancing broad bandwidth holographic optical element is achieved by an application of a multiple grating structure.

3. The method of claim 1, wherein the working range wavelength of the broad bandwidth of the stability-enhancing broad bandwidth holographic optical element is approximately 72 nanometers.

4. The method of claim 2, wherein the multiple grating structure comprises at least four grating structures.

5. The method of claim 4, wherein center-wavelengths of the at least four grating structures are 823 nanometers, 841 nanometers, 859 nanometers, and 877 nanometers, respectively.

6. The method of claim 1, wherein the predetermined wavelength of the beam of light is approximately 850 nanometers.

7. An optical package with enhanced temperature stability, comprising:
   a) an optical emitter for generating a predetermined beam of light having a predetermined wavelength;
   b) a photo-sensing unit for receiving a portion of the predetermined beam of light having the predetermined wavelength;
   c) a stability-enhancing broad bandwidth holographic optical element aligned on a common axis with the optical emitter, wherein the predetermined wavelength of the predetermined beam of light substantially coincides with a working range wavelength of a broad bandwidth of the stability-enhancing broad bandwidth holographic optical element, for enhancing the temperature stability of the optical package in response to changes in a thermal expansion of the stability-enhancing broad bandwidth holographic optical element and a change in the predetermined wavelength of the predetermined beam of light caused by temperature variations.

8. The optical package of claim 7, wherein the broad bandwidth of the stability-enhancing broad bandwidth holographic optical element is achieved by an application of a multiple grating structure.

9. The optical package of claim 7, wherein the working range wavelength of the broad bandwidth of the stability-enhancing broad bandwidth holographic optical element is approximately 72 nanometers.

10. The optical package of claim 8, wherein the multiple grating structure comprises at least four grating structures.

11. The optical package of claim 10, wherein center-wavelengths of the at least four grating structures are 823 nanometers, 841 nanometers, 859 nanometers, and 877 nanometers, respectively.

12. The optical package of claim 7, wherein the predetermined wavelength of the predetermined beam of light is approximately 850 nanometers.

13. A device for controlling a variable characteristic for automatic power control for a vertical cavity surface emitting laser VCSEL in an optical package, comprising:

a) a VSCEL for generating a beam of light having a predetermined wavelength;

b) a photo-sensing unit for receiving a portion of the beam of light having the predetermined wavelength;

c) a stability-enhancing broad bandwidth holographic optical element aligned on a common axis with the optical emitter wherein the predetermined wavelength of the beam of light substantially coincides with a working range wavelength of a broad bandwidth of the stability-enhancing broad bandwidth holographic optical element, for controlling a variable characteristic of an automatic power control for the VCSEL, wherein the variable characteristic changes based on a thermal expansion of the stability-enhancing broad bandwidth holographic optical element and a change in the predetermined wavelength of the beam of light when temperature changes.

14. The device of claim 13, wherein the broad bandwidth of the stability-enhancing broad bandwidth holographic optical element is achieved by an application of a multiple grating structure.

15. The device of claim 13, wherein the working range wavelength of the broad bandwidth of the stability-enhancing broad bandwidth holographic optical element is approximately 72 nanometers.

16. The device of claim 14, wherein the multiple grating structure comprises at least four grating structures.

17. The device of claim 16, wherein center-wavelengths of the at least four grating structures are 823 nanometers, 841 nanometers, 859 nanometers, and 877 nanometers, respectively.

18. The device of claim 13, wherein the predetermined wavelength of the predetermined optical beam is approximately 850 nanometers.

19. A device for controlling a variable characteristic of an optical interconnect system for signal transfer to at least one electrical element, comprising:

a) at least one optical emitter, positioned on an electrical substrate, generating a beam of light having a predetermined wavelength;

b) at least one electrical element positioned on the electrical substrate;

c) at least one optical transfer medium, overlying the electrical substrate, having at least one stability-enhancing broad bandwidth holographic optical element thereon for transferring the beam of light to the at least one electrical element, wherein the predetermined wavelength of the beam of light substantially coincides with a working range wavelength of a broad bandwidth of the stability-enhancing broad bandwidth holographic optical element, for controlling a variable characteristic of the optical interconnect system in response to changes in a thermal expansion of the at least one stability-enhancing broad bandwidth holographic optical element, and changes in the predetermined wavelength of the beam of light of the at least one optical emitter when temperature changes.

20. The device of claim 19, wherein the broad bandwidth of the stability-enhancing broad bandwidth holographic optical element is achieved by an application of a multiple grating structure.

21. The device of claim 19, wherein the working range wavelength of the broad bandwidth of the stability-enhancing broad bandwidth holographic optical element is approximately 72 nanometers.

22. The device of claim 20, wherein the multiple grating structure comprises at least four grating structures.

23. The device of claim 22, wherein center-wavelengths of the at least four grating structures are 823 nanometers, 841 nanometers, 859 nanometers, and 877 nanometers, respectively.

24. The device of claim 19, wherein the predetermined wavelength of the predetermined optical beam is approximately 850 nanometers.

* * * * *